(12) United States Patent  
Fujita et al.

(10) Patent No.: US 6,292,619 B1  
(45) Date of Patent: Sep. 18, 2001

(54) IMAGE EDITING SYSTEM

(75) Inventors: Hiroyuki Fujita, Kanagawa; Masayuki Takano; Masakatsu Kaburagi, both of Tokyo; Shingo Yamauchi, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/322,685

(22) Filed: May 28, 1999

Related U.S. Application Data

(63) Continuation of application No. 08/553,243, filed on Jul. 1, 1996, now Pat. No. 6,009,228.

(30) Foreign Application Priority Data

Mar. 16, 1994 (JP) .................................................. 06-071665  
Apr. 22, 1994 (JP) .................................................. 06-084952  
Mar. 16, 1995 (WO) ................................... PCT/JP95/00446

(51) Int. Cl.$^7$ ................................ H04N 5/76; H04N 5/92  
(52) U.S. Cl. ................................................. 386/52; 386/55  
(58) Field of Search ................................ 386/4, 52–65; 360/13; 369/83; 345/327, 328; H04N 5/76, 5/781, 5/78, 5/782, 5/783, 5/92, 9/79

(56) References Cited

U.S. PATENT DOCUMENTS

| | | | |
|---|---|---|---|
| 4,688,106 | * 8/1987 | Keller et al. | 360/63 |
| 4,979,050 | * 12/1990 | Westland et al. | 386/52 |
| 5,457,583 | * 10/1995 | Kaneko | 360/63 |
| 5,517,652 | * 5/1996 | Miyamoto et al. | 364/940.92 |
| 5,584,025 | * 12/1996 | Keithley et al. | 395/615 |
| 6,009,228 | * 12/1999 | Fujita et al. | 386/55 |

* cited by examiner

Primary Examiner—Thai Tran  
(74) Attorney, Agent, or Firm—Frommer Lawrence & Haug LLP.; William S. Frommer; Gordon Kessler

(57) ABSTRACT

An image editing system having an excellent editing operational efficiency. A recording/reproducing unit where compressed images have been recorded and an editing terminal unit are interconnected through a communication line. The compressed image which is needed at the time of editing is transmitted via the communication line without having recourse to a physical recording medium.

6 Claims, 10 Drawing Sheets

PLAYER_A CASETTE_1
PLAYER_B CASETTE_2

| CUT | PLAYER_A IN | PLAYER_A OUT | PLAYER_B IN | PLAYER_B OUT | RECORD IN | RECORD OUT | EFEECT |
|---|---|---|---|---|---|---|---|
| 001 | 00:00:00:00 | 00:00:01:29 | | | 01:00:00:00 | 01:00:01:29 | |
| 002 | 00:00:02:00 | 00:00:02:29 | 00:00:00:00 | 00:00:00:29 | 01:00:02:00 | 01:00:02:29 | WIPE from A to B |
| 003 | | | 00:00:01:00 | 00:00:03:29 | 01:00:03:00 | 01:00:05:29 | |

FIG. 10

IMAGE EDITING SYSTEM

This application is a continuation of U.S. application Ser. No. 08/553,243, filed Jul. 1, 1996, now U.S. Pat. No. 6,009,228.

TECHNICAL FIELD

The present invention relates to an image editing system, and more particularly, to an editing system where an image of high picture quality is an object of editing.

BACKGROUND ART

An editing operation is an operation where original images, recorded on a master tape, are reset according to the manufacturing intention of a broadcasting program and also an operation which takes substantial labor and time. Incidentally, the amount of operation and the time of operation needed for this editing operation are largely dependent upon the kind of program. Particularly in the case of the editing operation of a news program, a large amount of operation is needed in order to convert an original tape to a short story of several seconds to several minutes, and also from a point of prompt report, too much time cannot be spent on the editing operation. Therefore, the demand for a system which can efficiently edit is increasing.

Incidentally, in the systems being currently used in broadcasting stations, original tapes have been employed in the mutual data transfer between news gathering, editing, and sending, and the original tapes have been physically delivered.

Therefore, when the same original tape is needed in a plurality of departments, the original tape must be dubbed and therefore operational efficiency is not always good. Also, when this dubbing is performed, there is the problem that deterioration in picture quality cannot be avoided. In addition, since it takes a long time to convey an original tape, there is the inconvenience that a quick editing operation will become impossible.

DISCLOSURE OF INVENTION

The present invention has been made in view of the problems described above, and has been aimed at proposing an image editing system where the efficiency of the editing operation is excellent, as compared to the prior art.

To solve such problems, in the present invention, by recording a compressed image compressed by an image compressing unit to a recording-reproducing unit, this compressed image can be directly transmitted, at the time of editing, to an editing terminal unit via a communication line.

Also, in the present invention, by generating a minimally compressed image and a highly compressed image by compressing a video signal at first and second compressibilities, the minimally compressed image of excellent quality can be edited based on an editing procedure list obtained from the highly compressed image where the calculation time and the transmitting time are short.

In addition, by connecting a recording-reproducing unit and an editing terminal unit through a communication line, a compressed image which is needed at the time of editing can be read out into the editing terminal unit through the communication line without physically delivering the compressed image.

Furthermore, an editing procedure list can be efficiently generated by editing a highly compressed image where the calculation time and the transmitting time are shot, by way of trial experience.

BRIEF DESCRIPTION OF DRAWINGS

FIG. 10 is a diagram showing an example of an editing procedure list;

BEST MODE FOR CARRYING OUT THE INVENTION

Preferred embodiments of the present invention will hereinafter be described with reference to the accompanying drawings.

Figure 1:
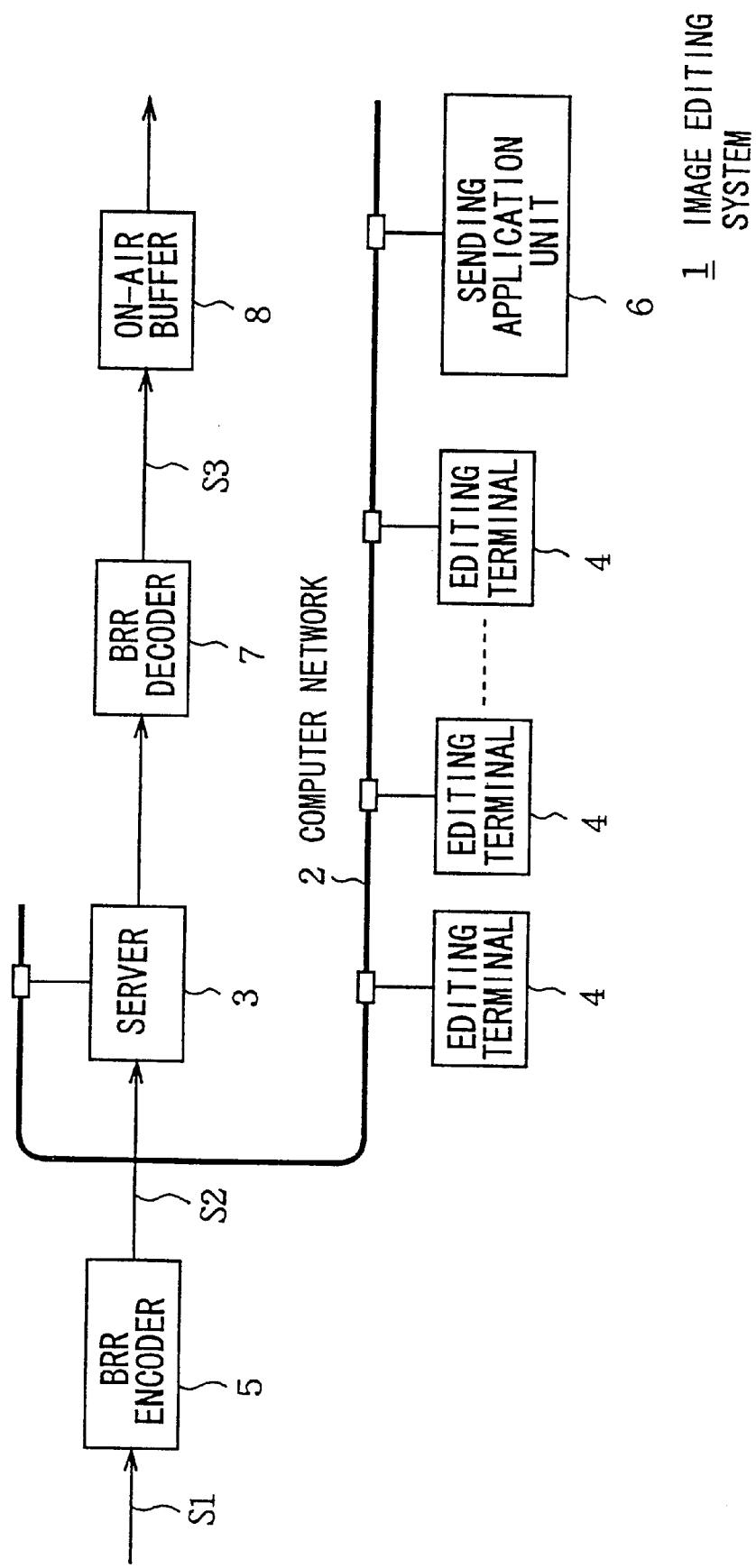
FIG. 1 is a block diagram showing an embodiment of an image editing system of the present invention.

(1) First Embodiment (1-1) Structure of Image Editing System (1-1-1) Overall Structure FIG. 1 shows the overall structure of an image editing system 1 realizing an on-line editing. This image editing system 1 is constituted by a server 3 and a plurality of editing terminal units 4, interconnected via a computer network 2. The image editing system 1 has realized the central management of the materials for editing and the high efficiency of the editing operation by transmitting and receiving image data necessary for editing via the computer network 2.

This image editing system 1 is constituted by the following sections.

A bit rate reduction (BRR) encoder 5 compresses an externally supplied baseband signal (video signal and sound signal) S1 and supplies it to the server 3. For example, the BRR encoder 5 compresses the baseband signal S1, which is input at a bit rate of 140 to 270 [Mbps], to a compressed signal S2 having a bit rate of 30 to 100 [Mbps]. Hence, this compressibility depends upon the quality that is required of a finally broadcasted image.

The server 3 comprises a recording/reproducing unit where a plurality of hard disks and parity disks are arranged in parallel. Hence, the structure of this recording/reproducing unit is called a redundant array of inexpensive disks (RAID). With this structure of the server 3, the recording/reproducing unit can record the video signals input from the BRR encoder 5 in a parallel manner at the same time and read out the video signals in a parallel manner at the same time.

At this time, the compressed signal S2 is recorded on the hard disk of the server 3 as a single file data. Also, in the server 3, the read operation and write operation of the compressed signal S2 are repeated according to the instruction from the editing terminal unit 4 so that the video signal, already edited along the intention of a broadcasting program, is recorded on the hard disk as a single file data.

The editing terminal unit 4 is employed to make the edit data along the intention of a broadcasting program by the control of the server 3. The internal structure of the editing terminal unit 4 will be described in the following paragraph. Hence, the editing terminal unit 4 has two edit modes. One is a direct control mode where image data on the hard disk of the server 3 is directly handled, and the other is a copy edit mode where image data is read out onto the hard disk incorporated in the editing terminal unit 4. A sequence of processes which will be executed in each mode will hereinafter be described.

First, when operating in the direct control mode, the editing terminal unit 4 directly controls the hard disk of the server 3 via the computer network 2 and reads out necessary image data via the computer network 2. At this time, the editing terminal unit 4 can also read out the image data recorded on the server 3 at quick feed.

If the editing terminal unit 4 receives the image data through the computer network 2 in this way, the data will be decoded by the decoder incorporated in the editing terminal unit 4 and the result of the decoding will be displayed on the display screen.

An operator repeats an operation where editing points (IN point and OUT point) are set while looking at the image being thus displayed on the screen and an operation where an image given by the set editing points is confirmed through the screen, and then makes editing data where an intended image is obtained. At this time, the editing data finally obtained is recorded on the hard disk of the server 3 as new file data.

Hence, when an image needs to be effected, for example, wiped or mixed, the editing terminal unit 4 reads necessary image data from the server 3 via the computer network 2 and then generates effect data by computing the data with an incorporated CPU or exclusive hardware. The editing terminal unit 4 then transmits this effect data to the hard disk of the server 3 through the computer network 2. When such an editing operation is completed, file data where a sequence of images edited along the operator's intention have successively been recorded is added onto the hard disk of the server 3.

On the other hand, when operating in the copy edit mode, the editing terminal unit 4 reads image data necessary for editing from the server 3 and then writes the image data to the hard disk through the computer network 2.

Thus, since necessary image data has been copied in advance to the hard disk of the editing terminal unit 4, the image data, read out of the hard disk of the editing terminal unit 4, is decoded by the decoder of the editing terminal unit 4, and the result of the decoding is displayed on the display screen.

The operator repeats an operation where editing points (IN point and OUT point) are set while looking at the image being thus displayed on the screen and an operation where an image given by the set editing points is confirmed through the screen, and then makes editing data where an intended image is obtained. At this time, the editing data finally obtained is stored on the hard disk of the editing terminal unit 4 as new file data.

Hence, when an image needs to be effected, likewise the effect data is generated by the computation with the CPU on the editing terminal unit 4 or on exclusive hardware and is stored on the hard disk of the editing terminal unit 4. When such an editing operation is completed, file data where a sequence of images edited along the operator's intention have successively been recorded is added to the hard disk of the editing terminal unit 4.

In the case of the copy edit mode, however, the file data thus generated on the editing terminal unit 4 is transmitted via the computer network 2 and recorded on the hard disk of the server 3.

A sending application unit 6 manages the file name and the recording area of the editing data recorded on the server 3, and reads out a specified file at a set time and then sends it to a BRR decoder 7.

The BRR decoder 7 expands the file data read out of the server 3 and outputs a baseband signal (video signal and sound signal) S3 of original bit rate. Also, at this time, the BRR decoder 7 converts the baseband signal S3 to a predetermined signal format.

Figure 2:
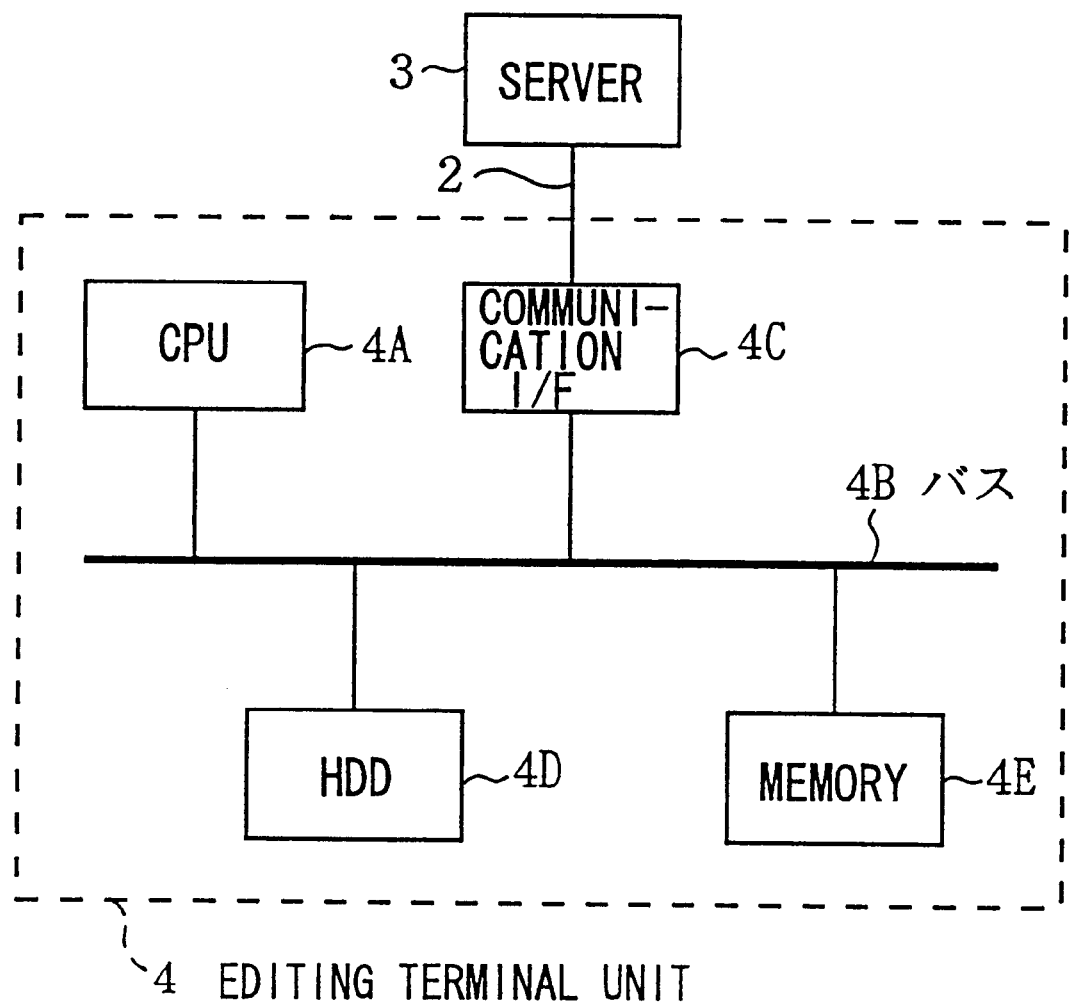
FIG. 2 is a block diagram showing an example of an editing terminal unit.

An on-air buffer 8 writes the baseband signal S3 in once so that images and sounds are not interrupted, and sequentially reads out and sends this written baseband signal S3.
(1-1-2) Structure of Editing Terminal Unit Now, the editing terminal unit 4 is constructed as shown in FIG. 2. The editing terminal unit 4 is constructed with a CPU 4A as a center (This CPU is a central role in overall function). The CPU 4A is connected to the computer network 2 through a bus 4B and a communication interface 4C so that necessary data can be transmitted and received between the editing terminal unit 4 and the server 3. Hence, the communication interface 4C includes a direct memory access (DMA) interface. In this embodiment, the DMA interface can transmit image data at a sufficient speed.

Also, to the bus 4B there is connected a hard disk drive (HDD) 4D where the image data read out of the server 3 is stored. Also, the image data, given edit processes (including an effect process), is sent from this HDD 4D to the server 3.

In addition, a memory 4E is connected to the bus 4B. The memory 4E, in addition to being used in various calculation processes, is used for storing control programs.

In addition to these, to the editing terminal unit 4 a display unit is incorporated or connected so that an image can be edited while looking at the contents of the image. Likewise, an input-output device is also connected so that editing points and editing contents can be input.

Figure 3:
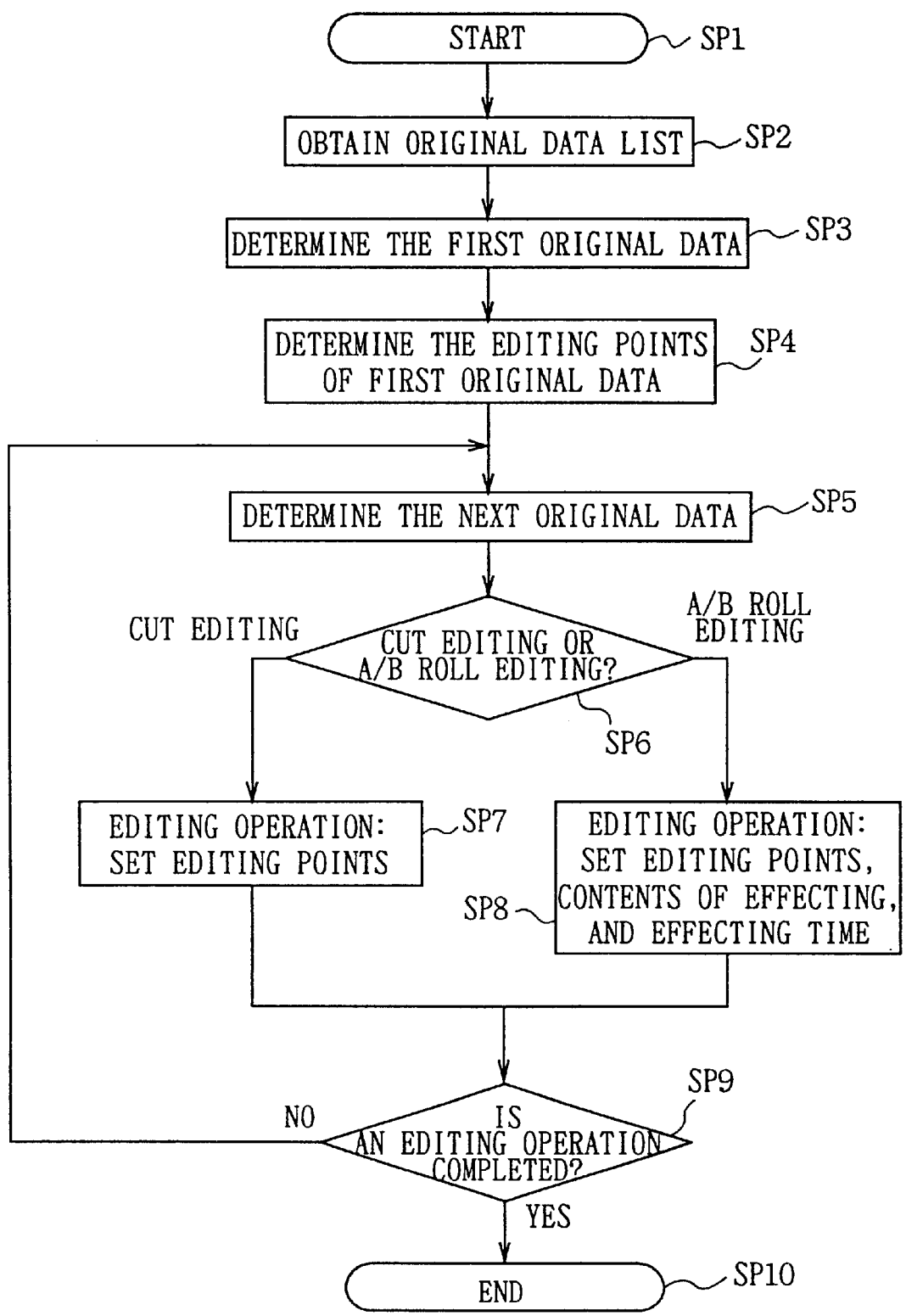
FIG. 3 is a flowchart showing the editing procedure at the time of a direct editing mode.

Furthermore, in the editing terminal unit 4 there is incorporated a decoder which decodes the image data reproduced from the HDD 4D or the image data received via the computer network 2.
(1-2) Editing Operation In the structure described above, there is described an example of an editing operation using the image editing system 1. As described above, there are two kinds of edit mode, a direct edit mode and a copy edit mode. Each edit mode will hereinafter be described.
(1-2-1) Direct Editing The editing operation at the time of the direct edit mode is executed with procedure shown in FIG. 3. Hence, assume that original data, carried in or transmitted from a news source, has been stored in the hard disk of the server 3 as a compressed signal S2.

If the operator manipulates the editing terminal unit 4 and accesses the server 3 (step SP1), an original data list being currently stored in the server 3 will be sent to the editing terminal unit 4 through the computer network 2. The original data list is displayed on the display screen, as shown in step SP2.

At the following step SP3, if the operator determines original data which is an object of editing from the original data list, file data corresponding to the determined original data will be read out of the hard disk of the server 3 and sent to the editing terminal unit 4 via the computer network 2. Thus, the operator can quickly read out necessary data via the computer network 2 without having recourse to a recording medium such as a video tape. Therefore, operational efficiency can be enhanced correspondingly.

The file data, read out to the editing terminal device 4, is decoded by the decoder and displayed on the screen of the display unit. At step SP4, the operator determines editing points (IN point, OUT point) while looking at the image being displayed on this display screen. The data, specified by these editing points, is recorded on the hard disk of the server 3 as new file data. If the setting operation of the editing points of the first original data is thus completed, the processing proceeds to step SP5. At step SP5, the next original data to be edited is determined.

The operation after this determination operation is divided into two, depending upon the contents of editing. This operation has a cut editing shown in FIG. 4 and an A/B roll editing shown in FIG. 5.

Figure 4:
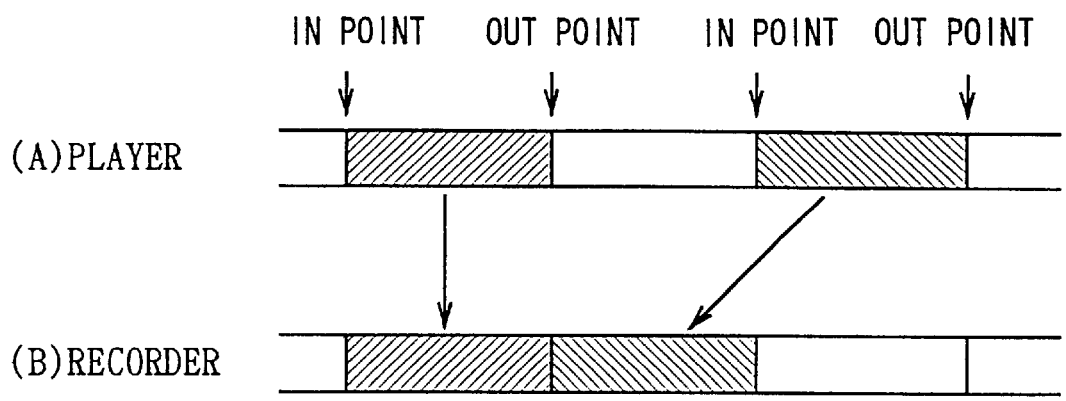
FIG. 4 is a diagram used to explain a cut editing.
Figure 5:
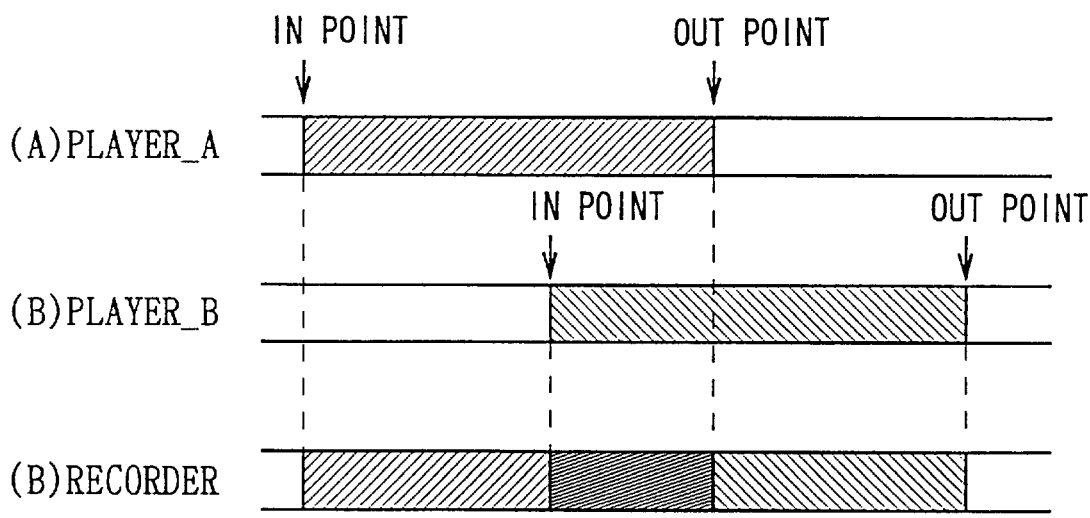
FIG. 5 is a diagram used to explain an A/B roll editing.

Now, the cut editing is referred to as an editing operation where two images, defined by different editing points (IN point, OUT point), are successively recorded, as shown in FIG. 4.

Also, the A/B roll editing is referred to as an editing operation where, by defining two images by different editing points (IN point, OUT point) and also by defining the period of time (indicated by dark oblique lines) in which two images are overlapped and read out, an image which gradually changes from one image to the other is recorded.

Figure 6:
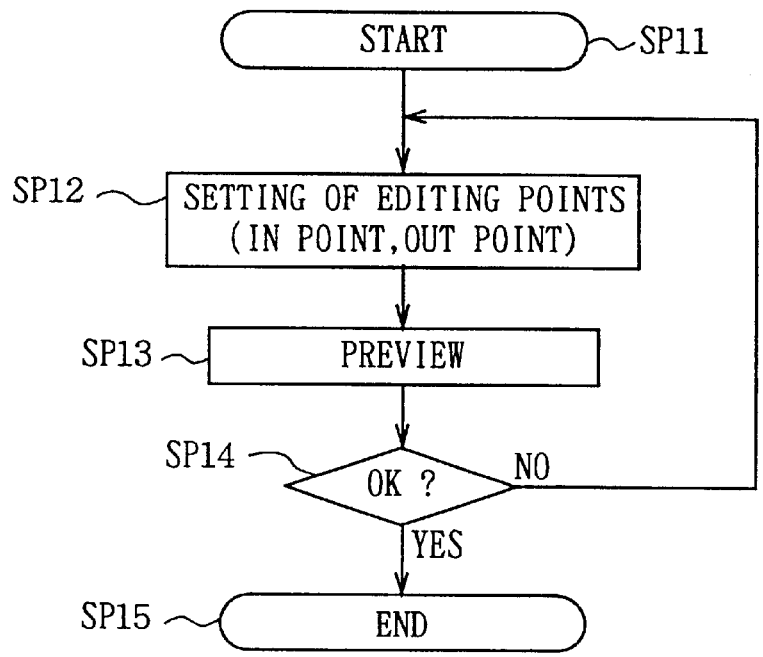
FIG. 6 is a flowchart showing the cut editing procedure.

Now, when the contents of editing are the cut editing, the editing operation proceeds from step SP6 to step SP7. The operational procedure of the subroutine corresponding to this step SP7 is shown in FIG. 6. First, at step SP12, the editing points (IN point, OUT point) of next original data which is connected to the previous original data are determined. Following the previous original data, this original data is recorded on the same file of the hard disk of the server 3 where the previous original data has been recorded.

The result of this editing, as shown in the following step SP13, is read from the server 3 through the computer network 2 to the editing terminal unit 4, and whether the result is an image along the operator's intention is confirmed on the screen. At this time, when the image being displayed on the screen is an image along the operator's intention, the cut editing operation proceeds from step SP14 to step SP15 and is completed. When, on the other hand, the displayed image differs from the operator's intention, the cut editing operation returns from step SP14 to step SP12. Then, the setting of the editing points and the confirming operation on the screen are repeated many times until the operator is satisfied.

Figure 7:
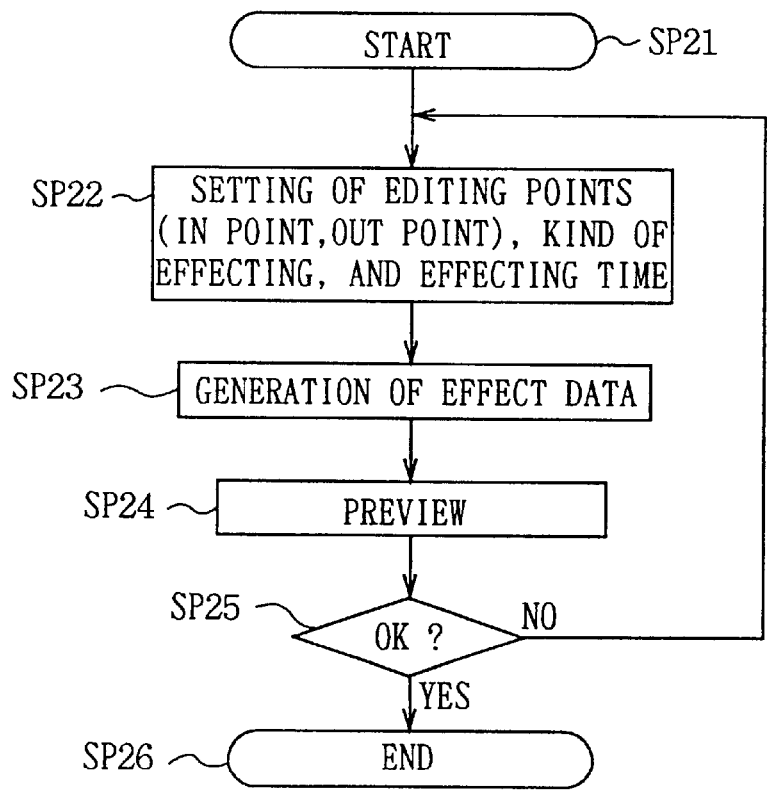
FIG. 7 is a flowchart showing the A/B roll editing procedure.

On the other hand, in the case of the A/B roll editing where the connected portion between two image data is effected, the editing operation proceeds from step SP6 to step SP8. The operational procedure of the subroutine corresponding to this step SP8 is shown in FIG. 7. First, at step SP22, the editing points (IN point, OUT point) of next original data, the kind of effecting, and the effecting time are set.

If the setting of this data is completed with the editing terminal unit 4, a necessary calculation process will be performed in the editing terminal unit 4 and effect data will be generated (step SP23). At this time, the effect data is transmitted from the editing terminal unit 4 to the server 3 and is recorded on the editing file where previous original data has been recorded. Hence, the effect data is written over the previous original data for the effecting time. Furthermore, the data portion following to this effect data is recorded following the effect data read out of another file, thereby generating editing data.

The result of this editing is displayed on the screen at step SP24, and whether the result is an image along the operator's intention is confirmed.

At this time, when the image being displayed on the screen is an image along the operator's intention, the A/B roll editing operation proceeds from step SP25 to step SP26 and is completed. When, on the other hand, the result of editing differs from the operator's intention, the A/B roll editing operation returns from step SP25 to step SP22. Then, a sequence of setting operations are repeated many times until the operator is satisfied.

If either step SP7 (step SP11 through step SP15) or step SP8 (step SP21 through step SP26) is completed, the editing operation proceeds to step SP9. At step SP9, whether the editing operation is completed is determined.

When the editing operation is continued, the editing operation returns to step SP5, and the cut editing operation or the A/B roll editing operation is repeated again.

When, on the other hand, the editing operation is completed, the operation proceeds to step SP10. At step SP10, a sequence of processes are completed. Incidentally, at this time, data on the record-address of the editing data obtained as a result of a sequence of editing operations, for example, the address on the hard disk of the server 3 is sent from the editing terminal unit 4 and recorded on the sending application unit 6.

Then, the sending application unit 6 reads out the file of the editing image recorded on the server 3 at the time of broadcasting, based on this data, and sends it via the on-line buffer, thereby completing a sequence of operations.

(1-2-2) Copy Editing

Figure 8:
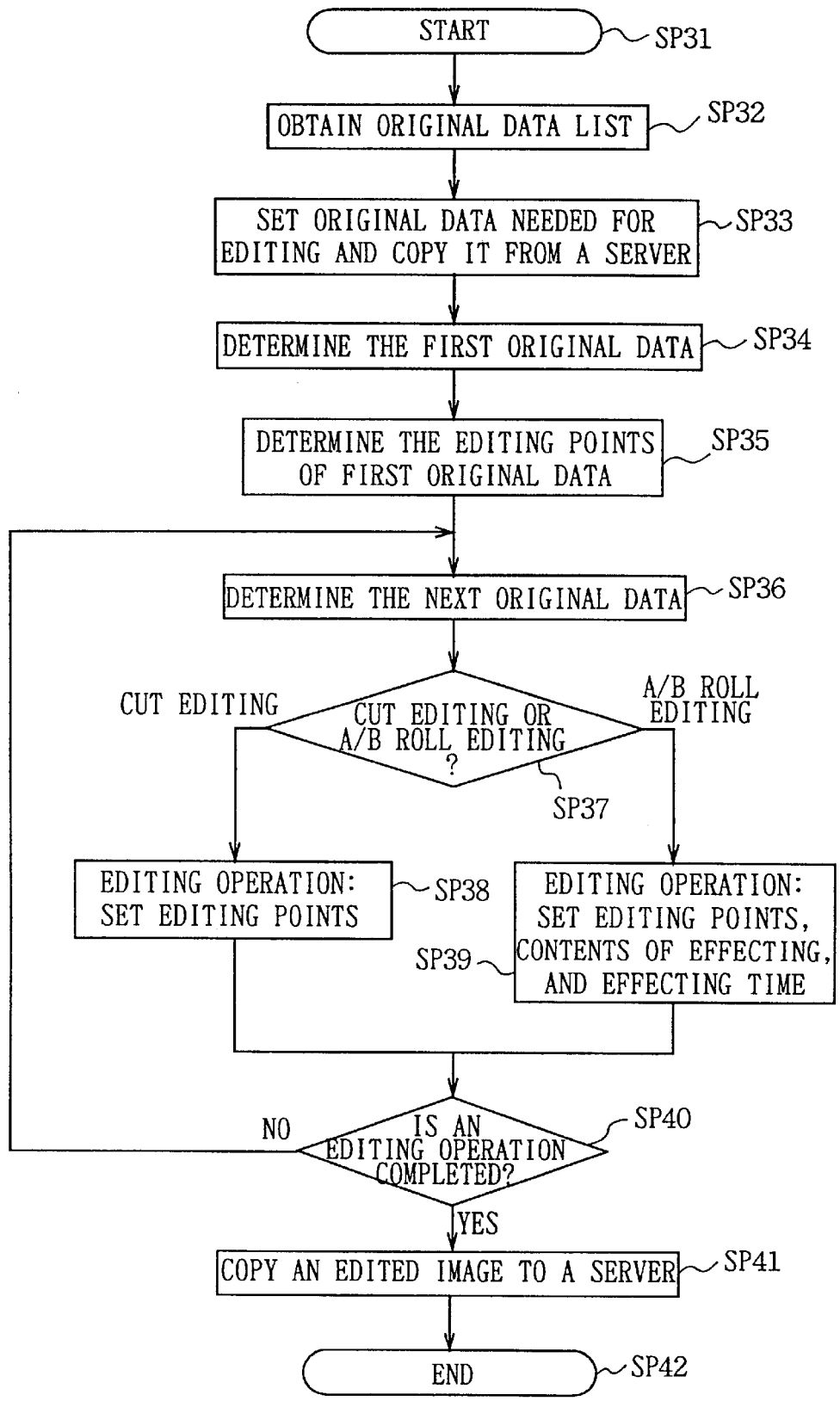
FIG. 8 is a flowchart showing the editing procedure at the time of the copy editing.

The editing operation at the time of the copy edit mode is executed with procedure shown in FIG. 8. Also, in this case, assume that original data, carried in or transmitted from a news source, has been stored in the hard disk of the server 3 as a compressed signal S2. Hence the operational procedure in the copy edit mode is substantially the same as the operational procedure in the direct edit mode.

The point of difference, in addition to necessary original data of the original data stored in the server 3 being stored in the hard disk of the editing terminal unit 4 through the computer network 2, is that an editing operation is executed in the editing terminal unit 4 and that a finally edited image is transmitted via the computer network 2 and recorded on the server 3 side.

An editing operation will hereinafter be described with these different points as center. First, if the operator manipulates the editing terminal unit 4 and accesses the server 3 (step SP31), an original data list being currently stored in the server 3 will be sent to the editing terminal unit 4 through the computer network 2. The original data list is displayed on the display screen, as shown in step SP32.

At the following step SP33, if the operator selects and sets original data needed for editing from the original data list, files on the set original data will be all transmitted from the server 3 to the computer network 2 and copied to the editing terminal unit 4.

If, incidentally, necessary original data is all copied from the server 3, then the first original data which is an object of editing will be selected at step SP34.

In the case of this copy edit mode, quick reading becomes possible as compared to the case where data is read out via the computer network 2, because the file data of the original data which is an object of editing can be all read out of the hard disk of the editing terminal unit 4 that the operator manipulates. Also, no picture quality is deteriorated because unlike the prior art there is no necessity of dubbing an original tape.

Now, the editing terminal unit 4 sequentially decodes the file data read out and displays these on the screen of the display unit. At the following step SP35, the operator determines the editing points (IN point, OUT point) of the first original data while looking at the image being displayed on the display screen. The data, specified by these editing points, is recorded on the hard disk on the editing terminal unit 4 as new file data. If the setting operation of the editing points of the first original data is thus completed, the processing proceeds to step SP36. At step SP36, the next original data to be edited is determined.

The operation after this determination operation is divided into two editings, a cut editing and an A/B roll editing.

When the contents of editing are the cut editing, the editing operation proceeds from step SP37 to step SP38. At this time, the editing operation which is executed is the same as the previously described editing operation in the direct edit mode. This copy edit mode, however, is different from the direct edit mode in that the reading area or recording area of the original data to be employed for editing or the new original data obtained by the editing operation is on the hard disk of the editing terminal unit 4.

When, on the other hand, the contents of editing is the A/B roll editing, the editing operation proceeds from step SP37 to step SP39. At this time, the editing operation which is executed is also the same as the previously described editing operation in the direct edit mode, and an effect image is obtained according to the operator's specification. In addition, this copy edit mode is different from the direct edit mode in that the reading area or recording area of the original data to be employed for editing or the new original data obtained by the editing operation is on the hard disk of the editing terminal unit 4.

If either the cut editing or the A/B roll editing is completed, the editing operation proceeds to step SP40. At step SP40, whether the editing operation is completed is determined. When the editing operation is continued, the editing operation returns to step SP36, and the cut editing operation or the A/B roll editing operation is repeated again.

When, on the other hand, the editing operation is completed, the operation proceeds to step SP41. At step SP41, the editing terminal unit 4 sends the file data of the edited image made with a sequence of editing operations to the hard disk of the server 3 via the computer network 2.

Also, at this time, data on the record-address of the editing data obtained as a result of a sequence of editing operations, for example, the address on the hard disk of the server 3 is sent from the editing terminal unit 4 and recorded on the sending application unit 6.

Then, the sending application unit 6 reads out the file of the edited image recorded on the server 3 at broadcasting time, based on this data, and sends it via the on-air buffer 8, thereby completing a sequence of operations.

(1-3) Advantages

According to the structure described above, an image editing system which can quickly deliver necessary data can be realized by interconnecting the server 3 and the editing terminal unit 4 via the computer network 2 and by directly transmitting and receiving original data and editing data via a communication line. With this, the system operational efficiency of the image editing system can be greatly enhanced.

Also, an image editing system which can share data between a large number of editing terminal units 4 can be obtained by adopting RAID structure as a recording/reproducing unit which is used in the server 3 and by writing and reading original data or editing data in a parallel manner at the same time. With this, the operational efficiency of each editing terminal unit 4 can be greatly enhanced.

In addition, the line occupied time between the server 3 and each of the editing terminal unit 4 can be shortened by writing data-compressed original data or editing data to the server 3 and by transmitting and receiving these compressed data between the server 3 and each of the editing terminal units 4. With this, even when a large number of editing terminal units 4 are connected via the computer network 2, an image editing system where the editing operation can be efficiently executed can be obtained without worrying about the response time.

Furthermore, the need for shoving a video tape in and out like a video tape recorder can be omitted by using a hard disk drive in the recording/reproducing unit of the server 3, thereby rendering an image editing system which can quickly respond to the control from a plurality of editing terminal units 4 obtainable.

Figure 9:
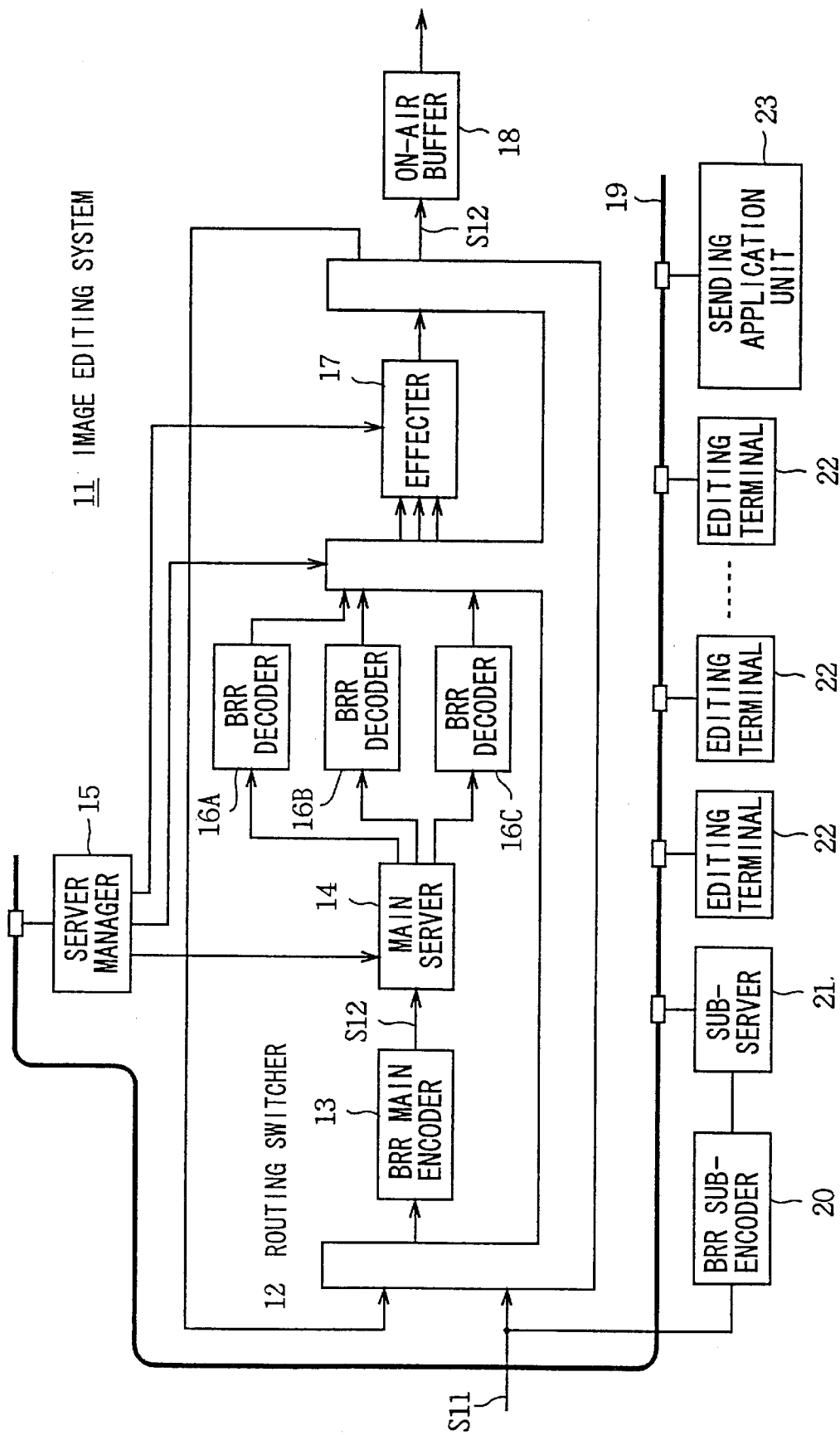
FIG. 9 is a block diagram showing another embodiment of an image editing system of the present invention.

(2) Second Embodiment
(2-1) Structure of Image Editing System
(2-1-1) Overall Structure In FIG. 9, there is shown the overall structure of an image editing system 11 for realizing an off-line editing. This image editing system 11 is characterized in that two kinds of original data for broadcasting and for transmission-editing which are different in compressibility are used. Whit this, the quality of file data is maintained and the efficiency of an editing operation is increased. The structure of the image editing system 11 is divided into a minimally compressed signal processing system handling signals for broadcasting and a highly compressed signal processing system handling signals for editing, which will hereinafter be described.

(2-1-1-1) Structure of Lowly Compressed Signal Processing System

The minimally compressed signal processing system is constituted by a routing switcher 12 for switching the input-output of a signal and a circuit section for generating file data for sending.

A BRR main encoder 13 receives either an external input signal selected by the routing switcher 12 or an internally generated signal and compresses it. The compressed signal is supplied to a main server 14. In this embodiment, the external input signal is a baseband signal (video signal and sound signal) S11 and the internally generated signal is a signal which has been passed through the editing operation of the image editing system 11 once or more.

At this time, the BRR main encoder 13 converts an input signal, which is input at a bit rate of 140 to 270 [Mbps], to an output signal having a bit rate of 30 to 100 [Mbps]. Hence, this compressibility is determined by the quality that is required of a final broadcasted image. This BRR main encoder 13 also compresses an image at units of 1 frame screen or 1 field screen. With this, an image of high picture quality is obtained. The output signal of the BRR main encoder 13 is input to the main server 14.

The main server 14 comprises a recording/reproducing unit such as a hard disk drive unit. The main server 14 records the compressed signal S12 on the hard disk as a single file data. The main server 14 records or reproduces the compressed baseband signal S12 in accordance with the instruction of a server manager 15.

The original data or editing data, read out of this main server 14, is input to a BRR decoder 16A, 16B, or 16C and decoded.

Each of the BRR decoders 16A, 16B, and 16C uncompresses the compression of the input original data or editing data and expands it, and outputs a baseband signal (video signal and sound signal) S13 of original data bit rate. For example, the BRR decoder 16A outputs a chromakey signal, and the BRR decoders 16B and 16C output a video signal for editing.

The routing switcher 12 switches the input-output of a signal by the control of the server manager 15 and gives necessary data of the original data or the editing data, output from the BRR decoders 16A, 16B and 16C, to an effecter 17.

The effecter 17 effects an input signal in accordance with the control of the server manager 15. Depending on whether the output of the effecter 17 can be aired as it is, the destination of the output of the effecter 17 is determined by the routing switcher 12.

For example, when the output of the effecter 17 can be aired as it is, the effecter output is given to the on-air buffer 18 through the routing switcher 12. When, on the other hand, the output of the effecter 17 needs to be effected in a multiplex manner, the effecter output is fed back to the input side and is input to the BRR main encoder 13. The foregoing is the structure of the minimally compressed signal processing system provided for broadcasting.

(2-1-1-2) Structure of Highly Compressed Signal Processing System

Now, the structure of the highly compressed signal processing system will be described. This highly compressed signal processing system is used in the generation of a editing procedure list.

A BRR subencoder 20 is provided in the head of this highly compressed signal processing system. The BRR subencoder 20 compresses the externally input baseband signal S11 at a high compressibility and is used to generate image data for editing. This is because the point of the editing operation is to set the editing points (IN point, OUT point) or to determine the contents of a special effect and an image does not always need to be high picture quality. Also, in the editing operation, the change of editing points and the confirming operation of editing results are needed many times. Therefore, if an image is a highly compressed image, there will be advantageous in that the calculating time will become short and the data transmitting time will become short.

In this embodiment, the BRR subencoder 20 converts, for example, a baseband signal S11 which is input at a bit rate of 140 to 270 [Mbps] to an output signal which is output at a bit rate of 4 [Mbps]. This compressibility is ten times greater than that of the BRR main encoder 13. Therefore, as will be described later, the time needed for original data to be transmitted and received via the computer network 19 is one-tenth or less of a case where minimally compressed data for broadcasting is transmitted and received. Also, since the baseband signal S11 is thus compressed at high compressibility, the calculating time needed for the editing terminal unit 22 to make effect data can be greatly reduced.

In addition, the BRR subencoder 20 in this embodiment compresses an input video signal with a joint photographic experts group (JPEG) format. That is, an image is compressed at units of 1 frame. With this, an editing operation at units of 1 frame can also be executed simply at the time of editing.

The output signal of the BRR main encoder 20 is input to a subserver 21.

The subserver 21, as with the main server 14, comprises a recording/reproducing unit such as a hard disk unit. The subserver 21 is connected to a computer network 19 so that original data is distributed to an editing terminal unit 22 through the computer network 19.

The editing terminal unit 22, as with the above-described editing terminal unit 4, is constituted by a CPU, a communication interface, a hard disk unit, and a decoder for expanding compressed data and returning it to the original data state.

The editing terminal unit 22 directly controls the hard disk of the subserver 21 in accordance with the operator's manipulation and reads necessary image data from the hard disk of the subserver 21 through the computer network 19. The image data read out is decoded by the incorporated decoder of the editing terminal unit 22 and displayed on the screen. The operator sets editing points (IN point, OUT point) and the contents of effecting, while looking at this image.

Hence, when the effecting is selected by the operator, the CPU of the editing terminal unit 22 generates effect data and the generated data is stored in the hard disk of the editing terminal unit 22.

In addition to above-described functions, the editing terminal unit 22 is provided with a function which records the editing procedure specified by the operator as an editing procedure e list.

The editing procedure list is a record of the original data name (number), the editing points (IN point, OUT point), and the contents of effecting, which have been specified by the operator during an editing operation. The list will be described in detail in the following paragraph. At the time that the editing operation has been completed, the editing terminal unit 22 transmits a latest editing procedure list to the server manager 15 through the computer network 19. This editing procedure list is recorded on the hard disk of the server manager 15 as a single list.

The reading of this file is managed by a sending application unit 23.

(2-1-2) Editing Procedure List

An example of the editing procedure list is shown in FIG. 10. At the head of the editing procedure list, original data (file data) to be reproduced is defined together w with its directory. In FIG. 10, for example, PLAYER_A CASSETTE_1 or PLAYER_B CASSETTE_2 corresponds to this. By this definition, a reproducing unit which records a plurality of original data on a single recording medium can read out target original data with reliability. Also, the defined original data (file name) and directory can be read out at the same time.

Following a definition sentence such as this, editing procedure and the contents are recoded as a list. The items of this list includes CUT representing the order of the execution of each cut editing, PLAYER_A IN, PLAYER_A OUT, PLAYER_B IN, and PLAYER_B OUT which specify the editing points (IN point, OUT point) of each reproducing unit, RECORDER IN and RECORDER OUT which specify the editing points (IN point, OUT point) of a recording unit, and EFFECT specifying the contents of effecting.

Figure 11:
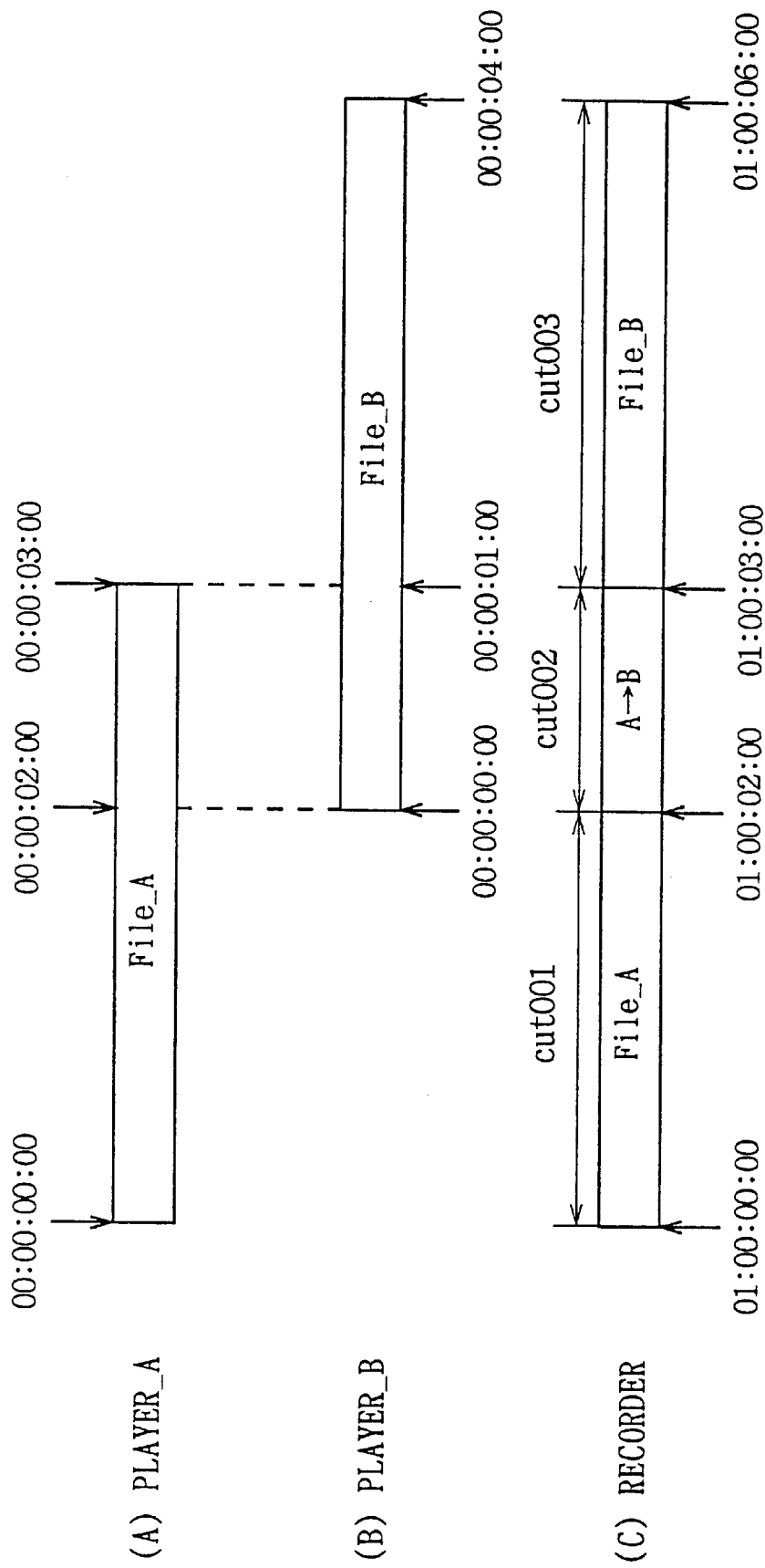
FIG. 11 is a diagram showing an example of editing.

For example, when original data is edited as shown in FIG. 11, the editing procedure list is completed as follows. The operator selects two places which are connected by editing in order, and sets a method of switching two places. In the case of the cut editing, the editing points (IN point, OUT point), set in each place, are recorded in order because the two places are simply connected.

On the other hand, in the case of the A/B roll editing, the time needed for switching places and the effecting at that time need to be determined in addition to the setting of the editing points. In the case of FIG. 11, wiping is selected as "effecting."

In the case of FIG. 11, the operator reproduces a file A for two seconds, then gradually switches the display screen from the image of the file A to the image of a file B for the next one second, and finally reproduces the file B for the next three seconds.

At this time, the operator fist sets the IN point (00:00:00:00) and the OUT point "00:00:02:29" of the file A and then sets the IN point "00:00:00:00" and the OUT point "00:00:03:29" of the following file B. Also, wiping is set as "effecting" for one second. Hence, "00:00:00:00" represents "00" hour "00" minute "00" second "00" frame.

At this time, the editing terminal unit 22 classifies the contents of the editing into three periods of time in which only the reproducing unit A is reproduced (i.e., cut number "001"), the period of time in which the reproducing units A and B are reproduced at the same time (i.e., cut number "002"), and the period of time in which only the reproducing unit B is reproduced (i.e., cut number "003"), and the editing contents are recorded in order for each period. This i shown in the editing procedure list of FIG. 10.

(2-2) Editing Operation

Figure 12:
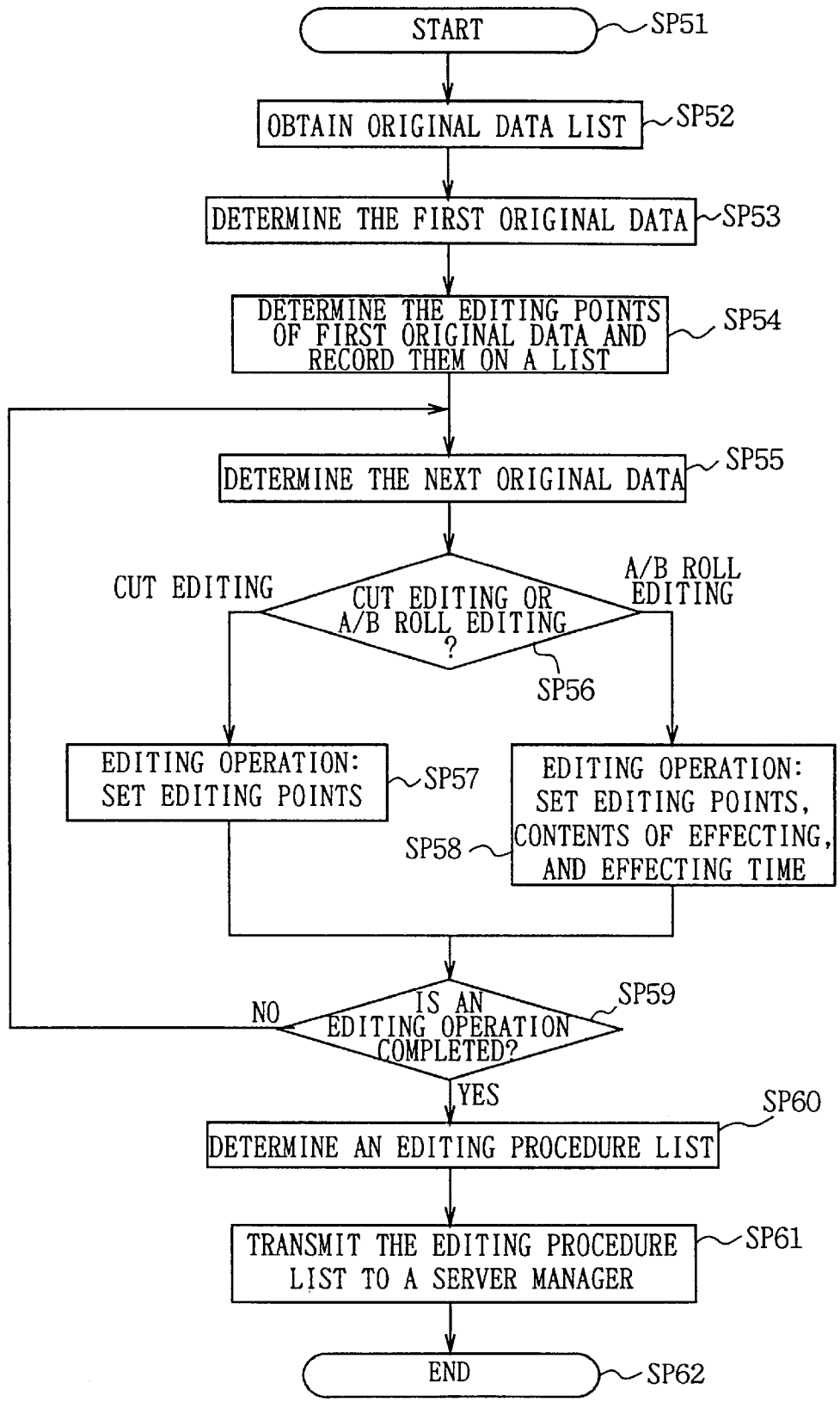
FIG. 12 is a flowchart showing editing procedure.

Finally, the editing procedure which is executed on this image editing system 11 is shown in FIG. 12.

First, the compressed signal S11 of the original data, carried or transmitted, is branched into two systems and input to the BRR main encoder 13 and the BRR subencoder 20. The BBR main encoder 13 sends a compressed baseband signal S12 of high picture quality, where the compressibility thereof is low, to the main server 14, and the signal S12 is recorded on the hard disk of the main server 14. On the other hand, the BBR subencoder 20 sends compressed data of low picture quality, where the compressibility thereof is high, to the subserver 21, and the data is recorded on the hard disk of the subserver 21.

Now, if the operator manipulates the editing terminal unit 22 and accesses the subserver 21 (step SP51), the original data list, stored in the subserver 21, will be sent to the editing terminal unit 22 through the computer network 19, and the list will be displayed on the display screen of the unit 22, as shown in step SP52.

If, at the following step SP53, the operator determines original data which is an object of editing from the original data list, the file data on the corresponding original data will be read out of the hard disk of the subserver 21 and sent to the editing terminal unit 22 through the computer network 19. Thus, the operator can read out necessary data via the computer network 19 without having recourse to a recording medium such as a video tape. Moreover, necessary data can be quickly read out because the compressibility of the compressed data has been set very high.

The file data, read out to the editing terminal unit 22, is decoded by the decoder of the editing terminal unit 22 and displayed on the display screen. At step SP54, the operator determines the editing points (IN point, OUT point) while looking at an image being displayed on this screen display. The data which are specified by these editing points are recorded on the hard disk of the subserver 21 as new file data. If the setting operation of the editing points of the first original data is thus completed, the editing operation proceeds to step SP55. At step SP55, the next original data to be edited will be determined.

The operation after this determination operation is divided into two, depending upon the contents of editing.

When the editing contents are a cut editing, the editing operation proceeds from step SP56 to step SP57. The operational procedure at this step SP57 is the same as FIG. 6. First the editing points (IN point, OUT point) of next original data which is connected to the previous original data are determined. Following the previous original data, this original data is recorded on the same file of the hard disk of the subserver 21 where the previous original data has been recorded.

The result of this editing is read from the subserver 21 through the computer network 19 to the editing terminal unit 22, and whether the result is an image along the operator's intention is confirmed on the screen. At this time, when the image being displayed on the screen is an image along the operator's intention, the cut editing operation is completed. When, on the other hand, the editing result differs from the 34 operator's intention, the confirming operation on the screen is repeated many times until the operator is satisfied.

On the other hand, in the case of the A/B roll editing where the connected portion between two image data is effected, the editing operation proceeds from step SP56 to step SP58. The operational procedure of the subroutine corresponding to this step SP58 is also the same as FIG. 7. First, the editing points (IN point, OUT point) of next original data, the kind of effecting, and the effecting time are set.

If the setting of these data is completed with the editing terminal unit 22, a necessary calculation process will be performed in the editing terminal unit 22 and effect data will be generated. At this time, the effect data is recorded on the hard disk of the editing terminal unit 22, and a normal cut editing image which is not effected is recorded on the subserver 21.

A sequence of these editing results are read out in order and displayed on the screen of the editing terminal unit 22, and whether the editing result is an image along the operator's intention is confirmed.

At this time, when the image being displayed on the screen is an image along the operator's intention, the A/B roll editing operation is completed. When, on the other hand, the displayed image differs from the operator's intention, a sequence of editing operations are repeated many times until the operator is satisfied.

If either the cutting editing operation or the A/B roll editing operation is completed, then whether the editing operation is completed is determined in step SP59. When the editing operation is continued, the editing operation returns to step SP55, and the cut editing operation or the A/B roll editing operation is repeated again.

When, on the other hand, the editing operation is completed, the operation proceeds to step SP60. At step SP60, the contents of a sequence of editing operations are set. At this time, a sequence of editing operations is finally determined as an editing procedure list.

This editing procedure list is sent from the editing terminal unit 22 through the computer network 19 to the sending application unit 23 and is temporarily stored until broadcasting time.

At the time of broadcasting, the editing procedure list is transmitted from the sending application unit 23 to the server manager 15, as shown in step SP61.

The server manager 15 controls the routing switcher 12, the main server 14, and the effecter 17, based on this editing procedure list, and sends an edited image of high picture quality via the on-air buffer 18. With the sending of this edited image of high picture quality, a sequence of editing operations are completed.

(2-3) Advantages

According to the structure described above, an editing procedure list is generated by editing highly-compressed image data where a baseband signal is compressed at high compressibility, and based on this editing procedure list, minimally compressed image data of low compressibility is actually edited and broadcasted, thereby realizing an image editing system where the shortage of the editing time and the high quality of an image to be broadcasted are compatible.

Also, expensive equipments do not need to be used in the editing terminal unit 22 because an highly compressed image is employed in the generation of an editing procedure list. In other words, expensive equipments are used only for broadcasting and therefore expensive equipments can be used efficiently.

In addition, the computer network 19 can be used more effectively because an image data which is transmitted, at the time of editing, from the server 21 to the editing terminal unit 22 is a highly compressed image. In other words, multiple access from a plurality of editing terminal units 22 can be realized.

(3) Other Embodiments

While the server 3, the main server 15, the subserver 21, and the hard disks of the editing terminal units 4 and 22 have been used in the above-described embodiments as a recording medium, the present invention is not limited to these recording media. A magnetic recording medium such as a magnetic tape or an optical recording medium such as a magneto-optical disc can be used.

Also, while it has been described in the above embodiments that original data is compressed at units of 1 frame or 1 field, the present invention is not limited to this. A compression method using the correlation between frames can be adopted.

In addition, while it has been described in the first embodiment that the editing image, obtained by the cut editing or A/B editing at the time of the direct edit mode or copy edit mode, is recorded on the hard disk of the server 3 as a single file data, the present invention is not limited to this. Only effect data can be recorded on the hard disk of the server 3 as new file data.

In such a case, the data portion of original data, which is used as it is, is given editing points (IN point, OUT point) by the sending application unit 6 at the time of broadcasting, the corresponding original data is read out of the hard disk of the server 3, and the data read out is connected to the effect data and sent. With this, the recording area of the hard disk of the server 3 can be used more effectively. Hence, the address of the effect data which is recorded on the hard disk of the server 3 is managed by the sending application unit 6, together with editing points before and after (IN point, OUT point).

Furthermore, although it has been described in the first embodiment that the editing image, obtained by the cut editing or A/B editing at the time of the direct edit mode or copy edit mode, is recorded on the hard disk of the server 3 as a single file data, the present invention is not limited to this. Images which are set by editing points can be recorded on the hard disk of the server 3 as a single file, respectively. For example, in the case of the cutting editing shown in FIG. 4, images may be recorded as two files, and in the case of the A/B roll editing shown in FIG. 5, images can be recorded as three files. With this, a necessary image of a sequence of editing images can be easily reused because a file corresponding to each editing point can be individually specified. In such a case, when a file corresponding to each editing point is recorded on the hard disk of the server 3, the address of the file is recorded on the sending application unit 6.

As described above, according to the present invention, the recording/reproducing unit and the editing terminal unit are interconnected through a communication line and a compressed image needed at the time of editing is transmitted via the communication line with having recourse to physical delivery, thereby realizing an image editing system where the editing operational efficiency is high.

Also, according to the present invention, an editing procedure list is generated with a highly compressed image where the calculation time and the transmitting time are short, and based on this editing procedure list, a minimally compressed image is newly edited, thereby realizing an image editing system where an editing image of high picture quality can be generated efficiently.

Industrial Applicability

The present invention is particularly applicable to an image editing system that is constituted by editing units where the object of editing is an image of high picture quality.

DESCRIPTION OF REFERENCE NUMERALS 1, 11 . . . image editing system, 2 . . . computer network, . . . server, 4, 22 . . . editing terminal unit, 5 . . . BRR encoder, 23 . . . sending application unit, 7, 16 A to 16 C . . . BRR coder, 8, 18 . . . on-air buffer, 12 . . . routing switcher, 13 . . . R main encoder, 14 . . . main server, 15 . . . server manager, . . . effecter, 20 . . . BRR subencoder, 21 . . . subserver.

What is claimed is:

1. An image editing system comprising:

An image compressing unit for compressing a video signal at a predetermined compressibility and generating a compressed image;

a recording/reproducing unit for recording or reproducing said compressed image or an editing image; and a plurality of editing terminal units, each operable to read said compressed image from said recording/reproducing unit via a communication line and to generate an independent edited image so that a user at each of said plurality of editing terminal units can view an independent edited image that is not seen on any other of said plurality of editing terminals, and can store edits to each of said independent edited images at said recording/reproducing unit independent of edits made at any other of said plurality of editing terminal units and independent of said compressed image, said edits comprising edit instructions so that only one copy of a complete image comprising said compressed image is maintained.

2. The image editing system according to claim 1, wherein said recording/reproducing unit has a plurality of recording media connected in parallel and records or reproduces said compressed image or said editing image through said plurality of recording media in a parallel manner at the same time.

3. The image editing system according to claim 1, wherein said each editing terminal unit directly controls said recording/reproducing unit via said communication line.

4. An image editing method comprising the steps of compressing a video signal at a predetermined compressibility by an image compressing unit and generating a compressed image;

recording or reproducing said compressed image or an editing image by a recording/reproducing unit;

reading said compressed image from said recording/reproducing unit via a communication line by a plurality of editing terminal units, each generating an independent edited image;

viewing said independent edited image that is not seen on any other of said plurality of editing terminals; and storing edits to each of said independent edited images at said recording/reproducing unit edited at each of a plurality of editing terminal units independent of edits made at any other of said plurality of editing terminal units and independent of said compressed image, said edits comprising edit instructions so that only one copy of a complete image comprising said compressed image is maintained.

5. The image editing method according to claim 4, wherein said recording/reproducing unit has a plurality of recording media connected in parallel and records or reproduces said compressed image or said editing image through said plurality of recording media in a parallel manner at the same time.

6. The image editing method according to claim 4, wherein each of said editing terminal units directly controls said recording/reproducing unit via said communication line.

* * * * *